United States Patent
Kamio (10) Patent No.: US 10,644,622 B2
(45) Date of Patent: May 5, 2020

(54) SHIFT RANGE CONTROL APPARATUS (71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/093,158

(22) PCT Filed: Mar. 6, 2017

(86) PCT No.: PCT/JP2017/008697
§ 371 (c)(1),
(2) Date: Oct. 12, 2018

(87) PCT Pub. No.: WO2017/179337
PCT Pub. Date: Oct. 19, 2017

(65) Prior Publication Data
US 2019/0131896 A1  May 2, 2019

(30) Foreign Application Priority Data

Apr. 15, 2016 (JP) .................................. 2016-81919
Sep. 9, 2016 (JP) .................................. 2016-176275

(51) Int. Cl.
*H02P 6/15* (2016.01)
*F16H 59/08* (2006.01)
(Continued)

(52) U.S. Cl.
CPC ............. *H02P 6/153* (2016.02); *F16H 61/28* (2013.01); *F16H 61/32* (2013.01); *F16H 59/08* (2013.01);
(Continued)

(58) Field of Classification Search
CPC .. H02P 6/153; F16H 59/08; F16H 2061/2823; F16H 61/28; F16H 2061/326; F16H 61/32
See application file for complete search history.

(56) References Cited

U.S. PATENT DOCUMENTS

2003/0222617 A1   12/2003  Nakai et al.
2004/0066166 A1*  4/2004  Nakai .................. H02P 6/24
                                                  318/701
(Continued)

FOREIGN PATENT DOCUMENTS

JP   2003-148599   5/2003
JP   2014-107949   6/2014
(Continued)

OTHER PUBLICATIONS

U.S. Appl. No. 16/292,630 of Kamio, filed Mar. 4, 2019 (corresponds to WO 2018/047924) (40 pages).
(Continued)

Primary Examiner — Kawing Chan
Assistant Examiner — Bradley R Brown
(74) Attorney, Agent, or Firm — Nixon & Vanderhye P.C.

(57) ABSTRACT

A shift range control apparatus switches shift range by controlling the drive of a motor. The shift range control apparatus includes a feedback controller that is configured to perform position feedback control based on a target angle determined corresponding to the request shift range and the actual angle of the motor; a stationary phase energization controller that is configured to perform stationary phase energization control that energizes a stationary phase selected corresponding to an actual angle; and a switching controller that switches between motor control states. The switching controller switches the control state to position feedback control when the request shift range is switched. When the difference between the target angle and the actual
(Continued)

angle becomes equal to or less than an angle determination threshold value, the switching controller switches the control state from position feedback control to the stationary phase energization control.

4 Claims, 8 Drawing Sheets

(51) Int. Cl.
*F16H 61/32* (2006.01)
*F16H 61/28* (2006.01)
*F16H 63/34* (2006.01)

(52) U.S. Cl.
CPC .. *F16H 63/3425* (2013.01); *F16H 2061/2823* (2013.01); *F16H 2061/326* (2013.01)

(56) References Cited

U.S. PATENT DOCUMENTS

| | | |
|---|---|---|
| 2005/0174084 A1 | 8/2005 | Nakai et al. |
| 2006/0006827 A1 | 1/2006 | Nakai et al. |
| 2006/0033464 A1 | 2/2006 | Nakai et al. |
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0068730 A1 | 3/2011 | Nakai et al. |
| 2011/0316458 A1* | 12/2011 | Yanagita ............... H02P 21/06 318/400.02 |
| 2015/0000449 A1 | 1/2015 | Sakaguchi et al. |
| 2015/0222211 A1* | 8/2015 | Maruo .................. H02P 6/24 318/612 |

FOREIGN PATENT DOCUMENTS

| | | |
|---|---|---|
| JP | 2017-190847 | 10/2017 |
| WO | 2017/208682 | 12/2017 |
| WO | 2018/047924 | 3/2018 |

OTHER PUBLICATIONS

U.S. Appl. No. 16/093,158, filed Feb. 5, 2019, Shift Range Control Apparatus.
U.S. Appl. No. 16/292,630, filed Mar. 5, 2019, Shift Range Control Device.

* cited by examiner

SHIFT RANGE CONTROL APPARATUS

CROSS-REFERENCE TO RELATED APPLICATIONS

This application is the U.S. national phase of International Application No. PCT/JP2017/008697 filed on Mar. 6, 2017 which designated the U.S. and claims priority to Japanese Patent Application No. 2016-81919 filed on Apr. 15, 2016, and Japanese Patent Application No. 2016-176275 filed on Sep. 9, 2016, the entire contents of each of which are incorporated herein by reference.

TECHNICAL FIELD

The present disclosure relates to a shift range control apparatus.

BACKGROUND ART

Conventionally, a shift range switching apparatus that switches a shift range by controlling a motor in accordance with a shift range switching request from a driver is known. Patent Literature 1 employs a switched reluctance motor as a driving source of the shift range switching mechanism, for example. Hereinafter, the switched reluctance motor may be referred to as a "SR motor".

The inventor of the present disclosure finds out the following. A structure of the SR motor without using a permanent magnet is simple. A motor using a permanent magnet such as a DC brushless motor has a fast responsiveness in comparative with a SR motor. However, hunting may occur by an effect of a cogging torque or the like when the motor is caused to stop in a case where a feedback gain increases in order to improve the responsiveness.

PRIOR ART LITERATURE

Patent Literature

Patent Literature 1: JP 4385768 B2

SUMMARY OF INVENTION

It is an object of the present disclosure to provide a shift range control apparatus enabling to appropriately control a motor drive related to switching of the shift range.

A shift range control apparatus according to one aspect of the present disclosure switches a shift range by controlling the motor drive and includes a feedback controller, a stationary phase energization controller, and a switching controller.

The feedback controller performs position feedback control based on a target angle determined corresponding to a request shift range and on an actual angle of the motor. The stationary phase energization controller performs stationary phase energization control energizing a stationary phase selected corresponding to the actual angle.

The switching controller switches the control states of the motor. The switching controller selects the position feedback control as the motor control state when the requested shift range is switched. The switching controller switches the control state from the position feedback control to the stationary phase energization control when difference value between the target angle and the actual angle becomes equal to or less than an angle determination threshold value.

According to the configuration as above, it may be possible to improve the responsiveness by performing the position feedback control at the time of switching the request shift range. It may be possible to appropriately stop the motor by switching from the position feedback control to the stationary phase energization control when the actual angle approaches the target angle. Thereby, it may be possible to appropriately control the motor drive related to the switching of the shift range.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

A shift range control apparatus according to the present disclosure will be hereinafter explained with reference to the drawings. Hereinafter, according to multiple embodiments, an explanation will be omitted by applying an identical reference to actually similar configuration.

First Embodiment

FIGS. 1 to 6 show the shift range control apparatus according to a first embodiment of the present disclosure.

Figure 1:
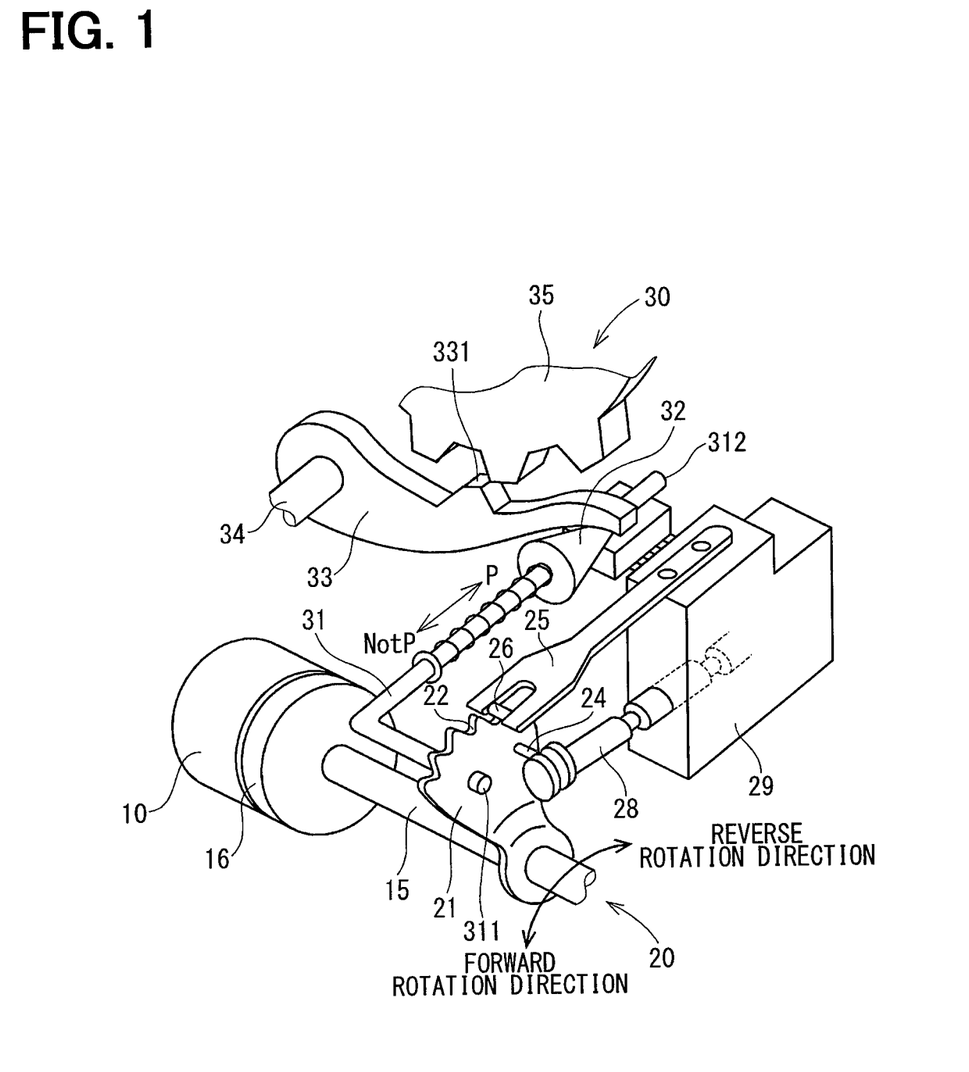
FIG. 1 is a perspective view showing a shift-by-wire system according to a first embodiment of the present disclosure.
Figure 2:
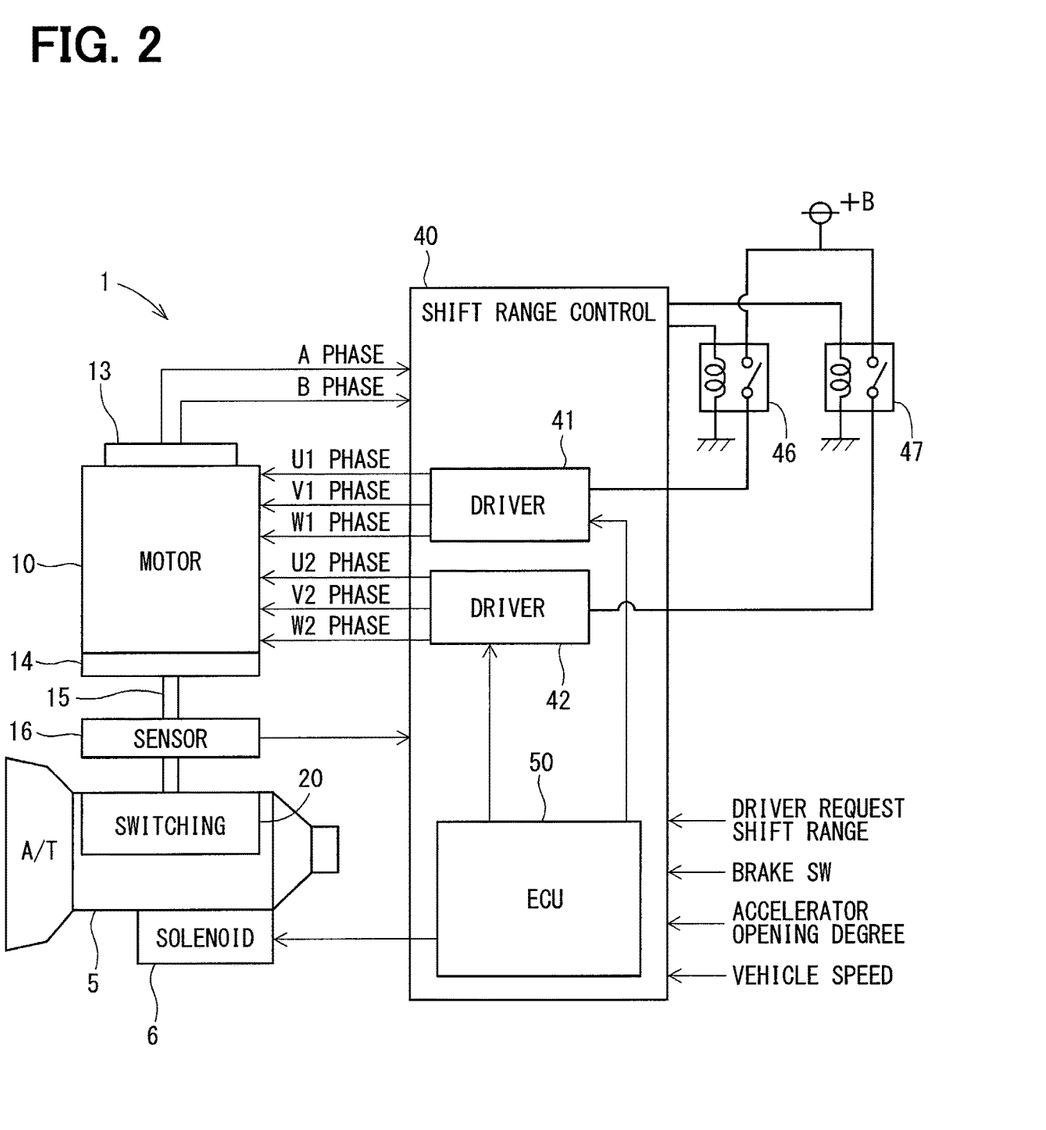
FIG. 2 is a diagram showing a schematic configuration of a shift-by-wire system according to the first embodiment.

As shown in FIGS. 1 and 2, a shift-by-wire system 1 includes a motor 10, a shift range switching mechanism 20, a parking lock mechanism 30, a shift range control apparatus 40, or the like.

Figure 3:
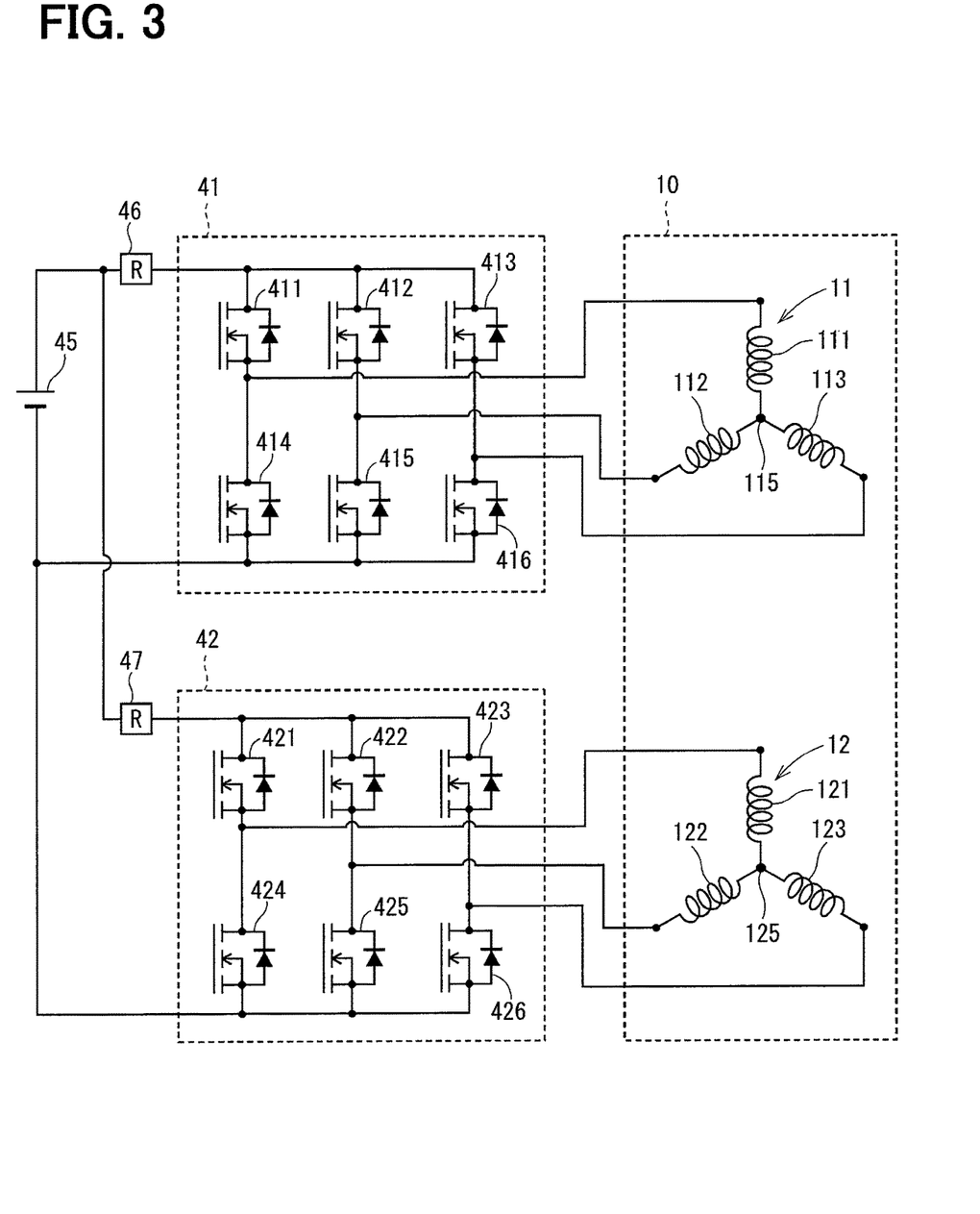
FIG. 3 is a circuit diagram showing a motor and a motor driver according to the first embodiment.

The motor 10 is rotated by the power supplied from a battery 45 (see FIG. 3) installed in a vehicle (not shown) and functions as the drive source of the shift range switching mechanism 20. The motor 10 is employed, the motor 10 being capable of changing the amount of current by feedback control and varying the command for each phase. The motor 10 of the embodiment is a permanent magnet DC brushless motor. As shown in FIG. 3, the motor 10 includes two sets of windings 11 and 12. The set of first windings 11 includes a U1 coil 111, a V1 coil 112, and a W1 coil 113. The set of second windings 12 includes a U2 coil 121, a V2 coil 122, and a W2 coil 123.

As shown in FIG. 2, an encoder 13 detects the rotation position of a rotor (not shown) of the motor 10. The encoder 13 is a magnetic rotation encoder, for example. The encoder is configured from a magnet rotating with the rotor, a Hall IC detecting magnetic fields, or the like. The encoder 13 synchronizes with the rotation of the rotor, and outputs A-phase and B-phase pulse signals for each predetermined angle.

A speed reducer 14 is provided between the motor shaft of the motor 10 and an output shaft 15. The speed reducer 14 reduces the rotation of the motor 10, and outputs the rotation of the motor to the output shaft 15. The rotation of the motor 10 is thus transmitted to the shift range switching mechanism 20. An output shaft sensor 16 is provided to the output shaft 15 for detecting the angle of the output shaft 15. The output shaft sensor 16 is a potentiometer, for example.

As shown in FIG. 1, the shift range switching mechanism 20 includes a detent plate 21, a detent spring 25, or the like. The shift range switching mechanism 20 transmits the rotation drive force output from the speed reducer 14 to a manual valve 28 and the parking lock mechanism 30.

The detent plate 21 is fixed to the output shaft 15 and is driven by the motor 10. According to the embodiment, a direction in which the detent plate 21 moves away from the proximal end of the detent spring 25 is referred to as a forward rotation direction. A direction in which the detent plate approaches the proximal end is referred to as a reverse rotation direction.

The detent plate 21 has a pin 24 protruding parallel with the output shaft 15. The pin 24 is connected to the manual valve 28. As the detent plate 21 is driven by the motor 10, the manual valve 28 reciprocates along an axial direction. That is, the shift range switching mechanism 20 converts the rotation motion of the motor 10 to linear movement and transmits it to the manual valve 28. The manual valve 28 is provided to a valve body 29. The reciprocating movement along the axial direction of the manual valve 28 switches hydraulic pressure supply paths to a hydraulic clutch (not shown) to switch the engaged state of the hydraulic clutch, so that the shift range is switched.

Four recesses 22 are placed on the side closer to the detent spring 25 of the detent plate 21, the four recesses retaining the manual valve 28 at positions corresponding to each shift range. The recesses 22 each correspond to each of the shift ranges of D (drive), N (neutral), R (reverse), and P (park) ranges from the proximal end of the detent spring 25.

The detent spring 25 is a resiliently deformable plate-shaped member. A detent roller 26 is placed at a tip of the detent spring 25. The detent roller 26 fits into one of the recesses 22.

The detent spring 25 presses the detent roller 26 toward the rotation center of the detent plate 21. A rotation force equal to or more than a predetermined level applied to the detent plate 21 deforms the detent spring 25 resiliently. The detent roller 26 moves from one recess 22 to another recess 22. With the detent roller 26 fitted in one of the recesses 22, the pivoting motion of the detent plate 21 is restricted, an axial direction position of the manual valve 28 and the state of the parking lock mechanism 30 are determined. The shift range of an automatic transmission 5 is fixed.

The parking lock mechanism 30 includes a parking rod 31, a conical member 32, a parking lock pawl 33, a shaft part 34, and a parking gear 35.

The parking rod 31 is generally L-shaped, and a side of one end 311 is fixed to the detent plate 21. The conical member 32 is provided to the other end 312 of the parking rod 31. The conical member 32 is formed so as to contract toward the other end 312. When the detent plate 21 pivots in the reverse rotation direction, the conical member 32 moves toward the direction of arrow P.

The parking lock pawl 33 abuts on a conical surface of the conical member 32 and can pivot around the shaft part 34. On the side of the parking gear 35 in the parking lock pawl 33, the parking lock pawl 33 has a protrusion 331 that can mesh with the parking gear 35. When the detent plate 21 rotates in the reverse rotation direction, the conical member 32 moves in the direction of arrow P, and the parking lock pawl 33 is pushed up so that the protrusion 331 meshes with the parking gear 35. By contrast, when the detent plate 21 rotates in the forward rotation direction and the conical member 32 moves in the direction of arrow "Not P", the protrusion 331 is dissolved to mesh with the parking gear 35.

The parking gear 35 is placed at an axle (not shown) so as to be capable of meshing with the protrusion 331 on the parking lock pawl 33. The parking gear 35 meshing with the protrusion 331 restricts the rotation of the axle. When the shift range is one of the ranges other than P (Not P range), the parking gear 35 is not locked by the parking lock pawl 33, so that the rotation of the axle is not stopped by the parking lock mechanism 30. When the shift range is the P range, the parking gear 35 is locked by the parking lock pawl 33, and the rotation of the axle is restricted.

As shown in FIGS. 2 and 3, the shift range control apparatus 40 includes motor drivers 41 and 42, an ECU 50, or the like.

The motor driver 41 is a three-phase inverter switching the energization of first windings 11. Switching elements 411 to 416 are bridge-connected. One end of the U1 coil 111 is connected to a connection point between the pair of U-phase switching elements 411 and 414. One end of the V1 coil 112 is connected to a connection point between the pair of V-phase switching elements 412 and 415. One end of the W1 coil 113 is connected to a connection point between the pair of W-phase switching elements 413 and 416. The other ends of the coils 111 to 113 are connected at a connection portion 115.

The motor driver 42 is a three-phase inverter switching the energization of second windings 12. Switching elements 421 to 426 are bridge-connected. One end of the U2 coil 121 is connected to a connection point between the pair of U-phase switching elements 421 and 424. One end of the V2 coil 122 is connected to a connection point between the pair of V-phase switching elements 422 and 425. One end of the W2 coil 123 is connected to a connection point between the pair of W-phase switching elements 423 and 426. The other ends of the coils 121 to 123 are connected at a connection portion 125.

While the switching elements 411 to 416 and 421 to 426 according to embodiment are MOSFETs, other devices such as IGBTs may also be employed.

A motor relay 46 is placed between the motor driver 41 and the battery 45. A motor relay 47 is placed between the motor driver 42 and the battery 45. The motor relays 46 and 47 turn on when a starter switch, such as an ignition switch or the like, turns on, so that power is supplied to the motor 10. The motor relays 46 and 47 turn off when the starter switch turns off, so that power supply to the motor 10 is shut off.

The ECU 50 controls the drive of the motor 10 by controlling on-off actuation of the switching elements 411 to 416, 421 to 426. The ECU 50 controls the drive of a transmission hydraulic control solenoid 6 based on vehicle speed, accelerator opening degree, and driver request shift range or the like. The transmission hydraulic control solenoid 6 is controlled and thereby shift stage is controlled. The transmission hydraulic control solenoid 6 is controlled and thereby shift stage is controlled. The number of the transmission hydraulic control solenoid 6 is placed corresponding to the number of the shift range or the like. According to the embodiment, though one ECU 50 controls the drive of the motor 10 and the solenoid 6, a motor ECU for motor control controlling the motor 10 and an AT-ECU may be severally provided. Hereinafter, a drive control of the motor 10 will be mainly explained.

Figure 4:
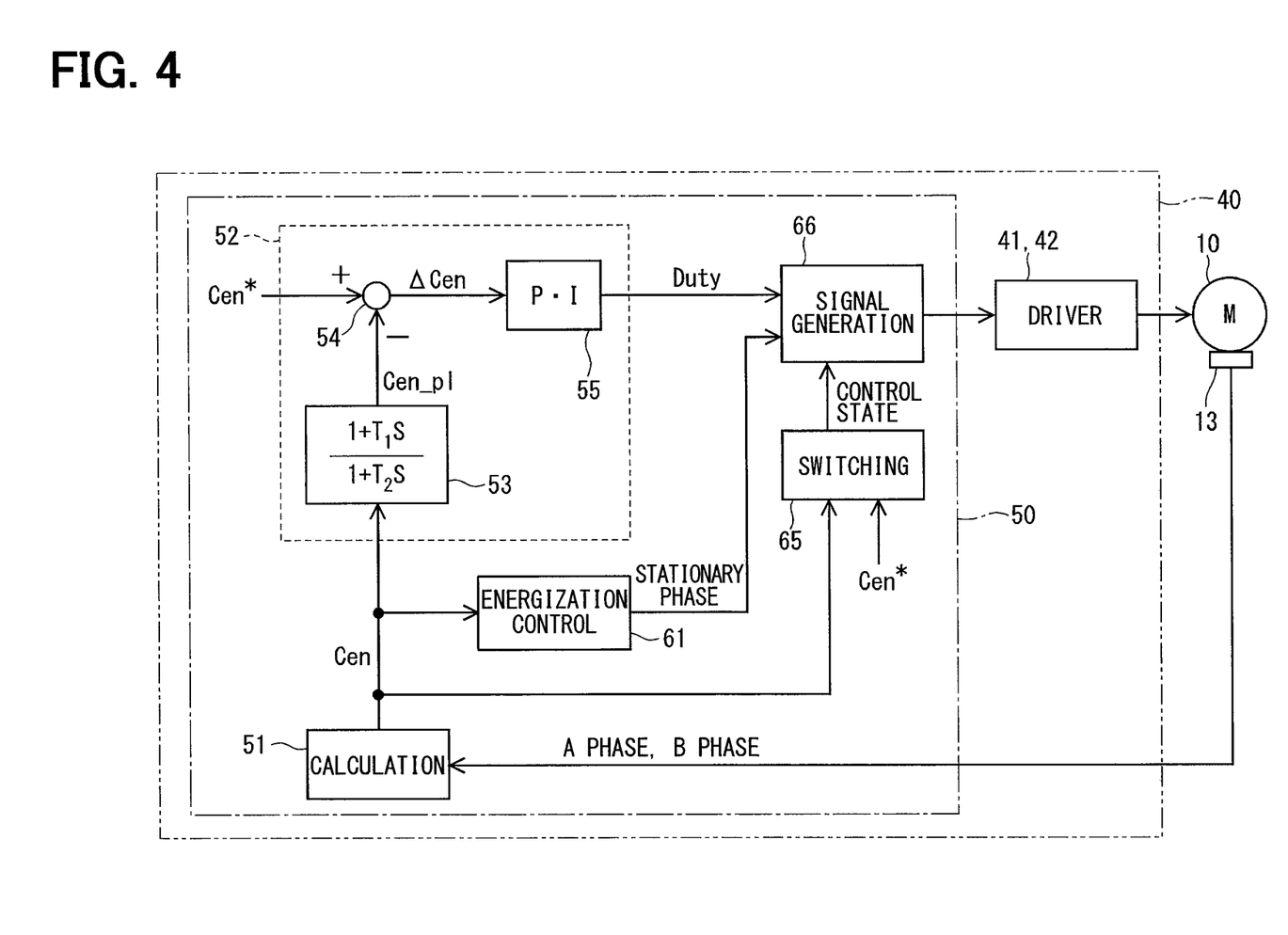
FIG. 4 is a block diagram showing the shift range control apparatus according to the first embodiment.

As shown in FIG. 4, the ECU 50 includes an angle calculator 51, a feedback controller 52, a stationary phase energization controller 61, a switching controller 65 and a signal generator 66 or the like, and is mainly configured from a microcomputer or the like. Various processes in the ECU 50 may be software processes of a program already stored in a tangible memory device such as a ROM and executed by a CPU, or may be hardware processes executed by special electronic circuits.

The angle calculator 51 calculates an actual count value Cen that is the count value of the encoder 13, based on the A-phase and B-phase pulses output from the encoder 13. The actual count value Cen is a value corresponding to the actual mechanical angle and the actual electrical angle of the motor 10. According to the embodiment, the actual count value Cen is referred to as the "actual angle".

As described above, the speed reducer 14 is placed between the motor shaft of the motor 10 and the output shaft 15. In a case where the motor shaft rotates within the range of play in gear teeth of the speed reducer 14 while the starter switch turns off, the relative position between the motor shaft and the output shaft 15 at when the starter switch turns off may be different from the relative position between the motor shaft and the output shaft 15 at when the starter switch turns on. Therefore, the angle calculator 51 performs initial learning and calculates a correction value when the starter switch is turned on. The initial learning adjusts the count value of the encoder 13 to the position of the output shaft 15 by a wall abutment control rotating the motor 10 in both directions and thereby abutting to the wall in the both sides of the gear meshing with the motor shaft. Hereinafter, the actual count value Cen is a value after being corrected with the correction value.

The feedback controller 52 includes a phase advance filter 53, a subtractor 54, and a controller 55, and performs position feedback control.

The phase advance filter 53 performs phase advance compensation advancing the phase of the actual count value Cen, and calculates a phase advance value Cen_pl. The concept of the "actual angle" includes the phase advance value Cen_pl after the phase advance filtering process.

The subtractor 54 calculates a deviation ΔCen between the phase advance value Cen_pl and a target count value Cen* in accordance with a driver shift range request inputted by an operation of a shifter or the like (not shown). That is, according to the embodiment, the phase lead value Cen_pl is fed back.

The controller 55 calculates a duty by PI control or the like so that the deviation ΔCen becomes zero, in order to match the target count value Cen* to the actual count phase advance value Cen_pl. In the position feedback control, the amount of current conducting through the coils 111 to 113 and 121 to 123 and the torque can be varied by changing the duty through PWM control or the like.

According to the embodiment, the drive of the motor 10 is controlled by a square-wave control with a 120° energization. In the square-wave control by the 120° energization, the high-voltage-side switching elements of a first phase and the low-voltage-side switching elements of the second phase turn on. The energization phase is switched by alternating the combinations of the first phase and second phase are every 60° electrical angle. Thereby, rotation magnetic fields occur in the windings 11 and 12, so that the motor 10 rotates. According to the embodiment, the rotation direction of the motor 10 at when the output shaft 15 rotates in the forward rotation direction is referred to as a forward direction. The duty at when the motor 10 outputs a positive torque is set to positive. The duty at when the motor outputs a negative torque is set to negative. The possible duty range is set from −100 [%] to 100 [%]. That is, the duty at when the motor 10 rotates in the forward rotation direction is positive, and the duty at when the motor rotates in the reverse rotation direction is negative. When a brake torque is generated to stop the motor 10 rotating in the forward rotation direction (i.e., negative torque), the duty is negative even though the motor 10 rotates in the forward rotation direction. Similarly, when a brake torque is generated to stop the motor 10 rotating in the reverse rotation direction, the duty is positive.

The stationary phase energization controller 61 performs stationary phase energization control. The stationary phase energization control is for stopping the rotation of the motor 10. In the stationary phase energization control, a stationary phase corresponding to an electrical angle is selected, and the switching elements 411 to 416 and 421 to 426 are controlled so that current flows in a predetermined direction of the selected stationary phase. Thereby, an excitation phase is fixed. When the excitation phase is fixed, the motor 10 stops at a predetermined electrical angle corresponding to the excitation phase. The stationary phase energization controller 61 selects the stationary phase and the energization direction, based on the actual count value Cen to stop the motor 10 at an electrical angle closest to the current rotor position.

The stationary phase energization control is performed when the difference between the actual count value Cen and the target count value Cen* becomes an angle determination threshold value ENth or lower. Therefore, when stationary phase energization control is performed, it is regarded that the actual count value Cen is substantially equal to the target count value Cen*. Therefore, it may be possible to stop the motor at a point substantially coincident at the target count value Cen* by stopping the motor 10 at the nearest electrical angle from a present rotor position. In detail, a difference of the amount of the motor resolution occurs at most between the electrical angle corresponding to the target count value Cen* and the electrical angle at which the motor 10 stops by the stationary phase energization control. When reduction ratio of the speed reducer 14 is large, the difference in the stopping position of the output shaft 15 has no difficulty.

The switching controller 65 switches the control states of the motor 10. According to the embodiment, the switching controller 65 switches between the position feedback control and the stationary phase energization control, based on the target count value Cen* and actual count value Cen.

The signal generator 66 generates a drive signal to turn on or off the switching elements 411 to 416 and 421 to 426 corresponding to the control state selected by the switching controller 65, and outputs the signal to the motor drivers 41 and 42. The drive of the motor 10 is thus controlled.

The switching control process will be explained with reference to the flowchart of FIG. 5. The process is executed on predetermined cycles by the ECU 50 during a period in which the starter switch turns on.

In S101, the ECU 50 determines whether the driver request shift range changes by the operation of the shift lever not shown in the drawings by the driver. When it is determined that the driver request shift range does not change (S101: NO), the process shifts to S103. When it is determined that the driver request shift range changes (S101: YES), the process shifts to S102.

In S102, the ECU 50 turns on the energization flag to the motor 10. On-off process of the energization flag may be executed in the switching controller 65 or may be executed separately from the switching controller 65.

In S103, the switching controller 65 determines whether the energization flag turns on. When it is determined that the energization flag turns on (S103: YES), the process shifts to S105.

In S104, the switching controller 65 resets a timer value Tc, which is described later, and the process ends.

In S105, the switching controller 65 determines whether an absolute value of the difference between the target count value Cen* and the actual count value Cen exceeds the angle determination threshold value ENth. Hereinafter, the absolute value of the difference between the target count value Cen* and the actual count value Cen may be referred to as angle deviation e. According to the embodiment, the angle deviation e corresponds to "difference value between a target angle and the actual angle". The angle determination threshold value ENth is set to the count number corresponding to a predetermined value close to 0 (for example, 0.5° at a mechanical angle). When it is determined that the angle deviation e is equal to or less than the angle determination threshold value ENth (S105: NO), the process shifts to S107. When the angle deviation e exceeds the angle determination threshold value ENth (S105: YES), the process shifts to S106.

In S106, the switching controller 65 selects the position feedback control as the control state of the motor 10.

When it is determined that the angle deviation e is equal to or less than the angle determination threshold value ENth (S106: NO), the process shifts to S107. In S107, the switching controller 65 increments the timer value Tc that is the count value of a timer clocking duration of the stationary phase energization control.

In S108, the switching controller 65 determines whether the timer value Tc is less than a duration determination threshold value Tth. The duration determination threshold value Tth is set corresponding to the energization duration Ta continuing the stationary phase energization control (for example, 100 ms). When it is determined that the timer value Tc is less than the duration determination threshold value Tth (S108: YES), the process shifts to S109. When it is determined that the timer value Tc is equal to or exceeds the duration determination threshold Tth, the process shifts to S110.

In a case where the energization duration Ta does not elapse after the stationary energization control starts, the process shifts to S109. In S109, the switching controller 65 selects the stationary energization control as the control state of the motor 10.

In a case where the energization duration elapses after the stationary phase energization control starts, the process shifts to S110. In S110, the switching controller 65 sets the control state of the motor 10 to the energization off control. In the energization off control, the signal generator 66 outputs a signal turning off all of the switching elements 411 to 416, 421 to 426 of the motor drivers 41 and 42 to the motor drivers 41 and 42, and turns off the switching elements 411 to 416, 421 to 426. Thereby, at the time of the energization off control, the power is not supplied to the side of the motor 10. The motor relays 46 and 47 turn on during the energization off control since the motor relays 46 and 47 continue to turn on while the starting switch turns on.

The ECU 50 turns off the energization flag.

Figure 6:
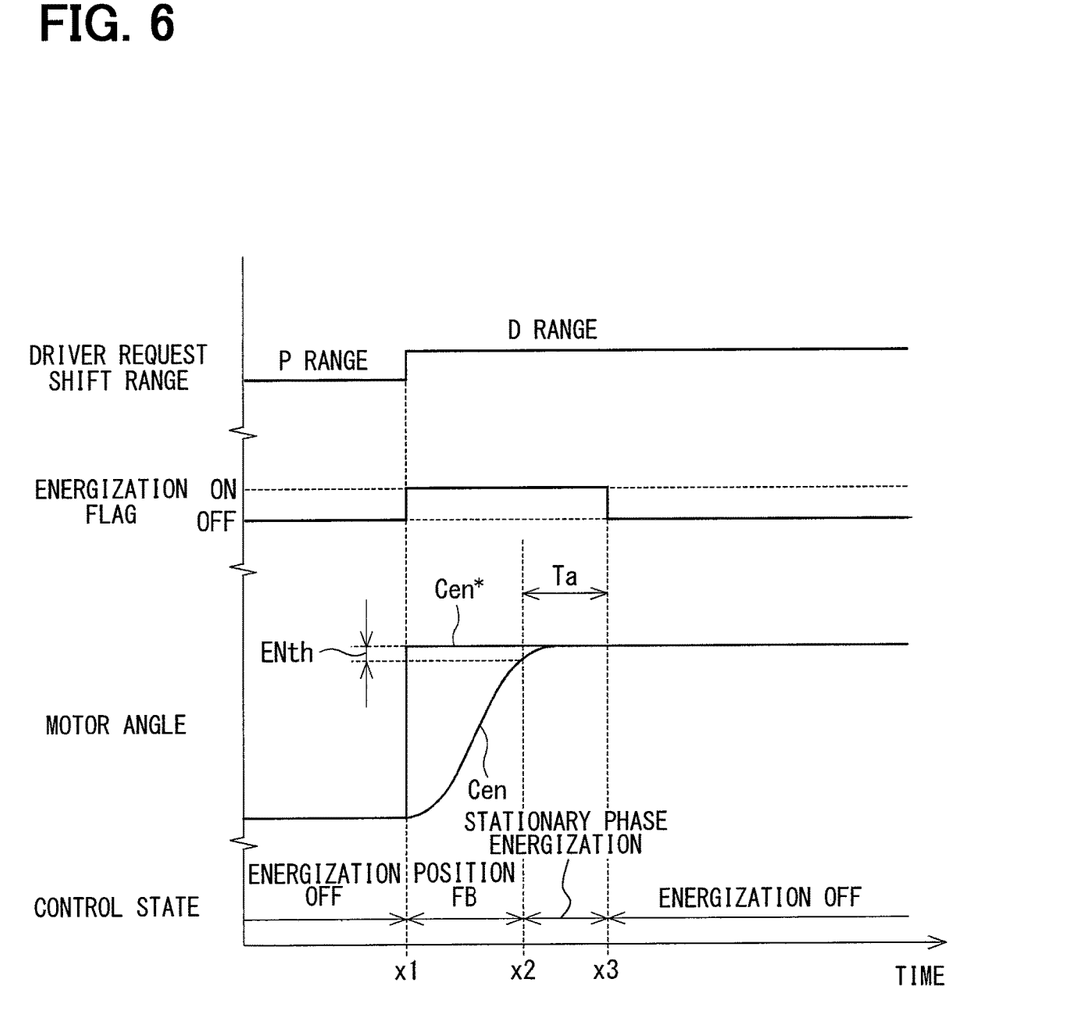
FIG. 6 is a time chart explaining a switching control process according to the first embodiment.

The actual shift range determination process will be described with reference to the time chart of FIG. 6. In FIG. 6, common time axis is set as horizontal axis. FIG. 6 shows the driver request shift range, the energization flag, the motor angle showing the angle of the motor 10, and the control state showing the control state of the motor 10. The motor angle in FIG. 6 indicates the angle of the motor 10 with count values of the encoder 13.

As shown in FIG. 6, before time x1, when the driver request shift range is maintained at P range, the motor 10 is subjected to energization off control.

At time x1, when the driver shift range request changes from P range to D range, the energization flag switches from off to on. The switching controller 65 switches the control state of the motor 10 from the energization off control to the position feedback control.

As shown at the motor angle of FIG. 6, the target count value Cen* is set corresponding to the driver request shift range. Immediately after the time x1 at when the request shift range switches, the motor 10 is controlled by the position feedback control since the difference between the target count value Cen* and the actual count value Cen exceeds the angle determination threshold value ENth. Thereby, the actual count value Cen approaches the target count value Cen*. It may be possible to improve the responsiveness by performing the feedback of the phase advance value Cen_pl after the phase advance filter process is executed to the phase advance value Cen_pl.

At time x2, when the difference between the target count value Cen* and the actual count value Cen becomes the angle determination threshold value ENth or lower, the control state of the motor 10 is switched from the position feedback control to the stationary phase energization control. The stationary phase energization enables the motor 10 to stop quickly.

During the period from time x2 to time x3 when the continuous energization time Ta has passed, the stationary phase energization control continues. This prevents hunting or the like and enables the motor 10 to stop reliably, so that it may be possible to surely fit the detent roller 26 to a desired recess.

At the time x3 when the energization duration Ta elapses from start of the stationary phase energization control, the control state is set to the energization off control and the energization flag is set to off. The off-state of the energization flag is kept until the driver shift range requested is changed again, so that the energization off control of the motor 10 continues as the control state of the motor 10. Thereby, no power is supplied to the motor 10 except when the shift ranges are switched, so that it may be possible to reduce power consumption as compared to when power application continues.

In FIG. 6, though an example that the driver request shift range is switched from the P range to the D range is explained, it is also similar to the control at the time of switching the other range.

According to the embodiment, DC brushless motor is employed as the motor 10 that is an actuator of the shift-by-wire system 1. By using the DC brushless motor, it may be possible to improve responsiveness and efficiency in comparison to a case of using SR motor, for example. Specifically, it may be possible to improve the responsiveness by performing the position feedback control when the difference between the target count value Cen* and the actual count value Cen is large.

By contrast, in order to improve the responsiveness, for example, in a case where the feedback gain is set to be large, the hunting may occur when the motor 10 stops at the predetermined position. According to the embodiment, when the actual count value Cen approaches the target count value Cen*, the hunting is restrained by switching from the feedback position control to the stationary energization control, and the motor 10 stops appropriately.

That is, according to the embodiment, the DC brushless motor is employed as the actuator of the shift-by-wire system 1. It may be possible to provide both improvements of the responsiveness in early times of shift range switching and stability at when the shift switching is completed, by switching the position feedback control and the stationary phase energization control.

As explained above, the shift range control apparatus 40 switches the shift range by controlling the drive of the motor 10, and includes the feedback controller 52, the stationary phase energization controller 61 and the switching controller 65.

The feedback controller 52 performs position feedback control, based on the actual angle of the motor 10 (the actual count value Cen according to the embodiment) and the target angle determined corresponding to the requested shift range (the target count value Cen* according to the embodiment).

The stationary phase energization controller 61 performs the stationary phase energization control in which the power is supplied to a stationary phase selected corresponding to an actual angle.

The switching controller 65 switches the control states of the motor 10. In detail, the switching controller 65 sets the control state to the position feedback control when the request shift range is switched. The switching controller 65 switches the control state from the position feedback control to the stationary phase energization control when the difference value between the target angle and the actual angle is equal to or less than the angle determination threshold value ENth.

According to the embodiment, it may be possible to improve the responsiveness by performing the position feedback control when the request shift range is switched. It may be possible to stop the motor 10 appropriately by switching from the position feedback control to the stationary phase energization control when the actual angle approaches the target angle. Thereby, it may be possible to appropriately control the drive of the motor 10 related to the switching of the shift range.

The switching controller 65 continues the stationary phase energization control until the energization duration Ta elapses after the stationary energization control is switched to the position feedback control. The switching controller 65 switches to the energization off control in which the energization of the motor 10 is shut off, when the energization duration Ta elapses after the position feedback control has been switched to the stationary energization control.

It may be possible to surely stop the motor 10 by continuing the stationary phase energization control for the energization duration Ta. It may be possible to reduce the power cost by performing the energization off control after the energization duration Ta elapses.

The feedback controller 52 is placed with the phase advance filter 53 advancing the phase of the actual angle. The phase advance value Cen_pl after an execution of the phase advance filter process is provided as a feedback. Thereby, it may be possible to improve the responsiveness at the time of the position feedback control.

Second Embodiment

Figure 7:
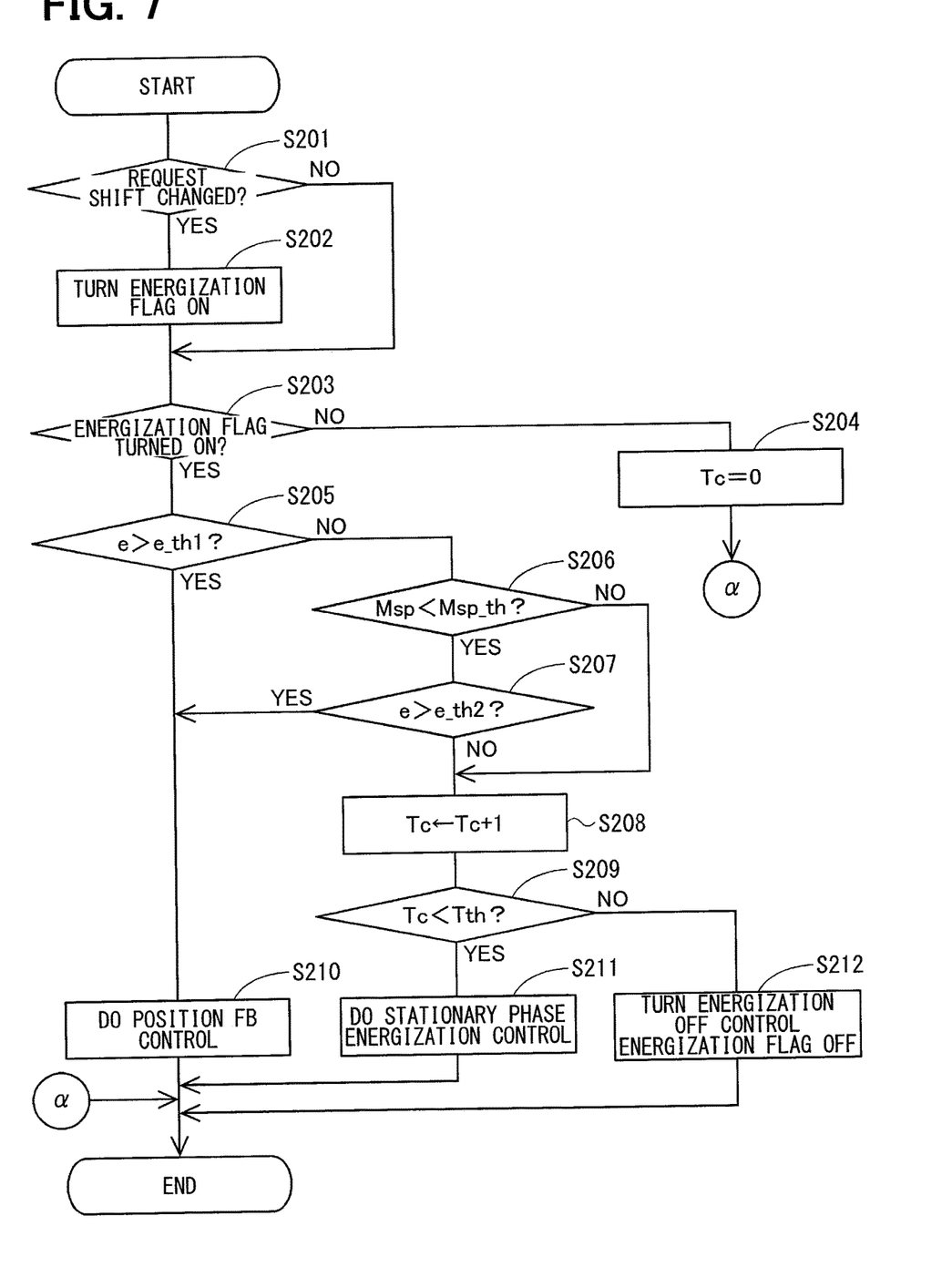
FIG. 7 is a time chart explaining a switching control process according to a second embodiment.
Figure 8A:
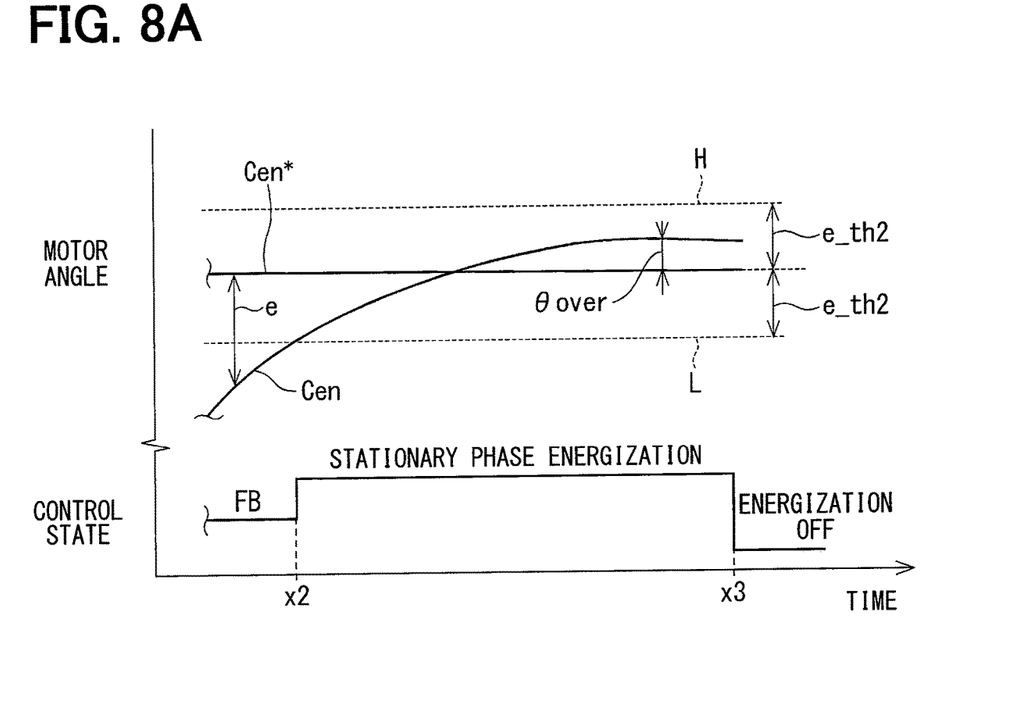
FIG. 8A is an explanatory view explaining an amount of over shoot according to the second embodiment.
Figure 8B:
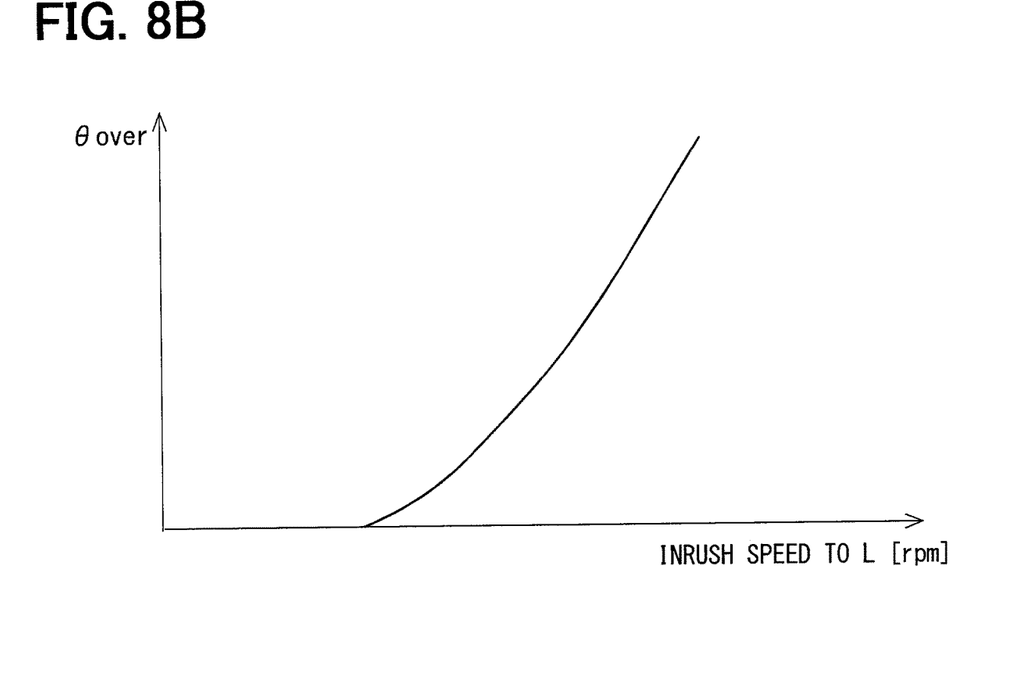
FIG. 8B is an explanatory view explaining the amount of over shoot according to the second embodiment.

The second embodiment of the present disclosure is shown in FIG. 7, FIG. 8A and FIG. 8B. According to the embodiment, since the switching control process is different from the embodiment described above, the point will be mainly explained.

The switching control process according to the embodiment will be explained with reference to the flowchart of FIG. 5.

Figure 5:
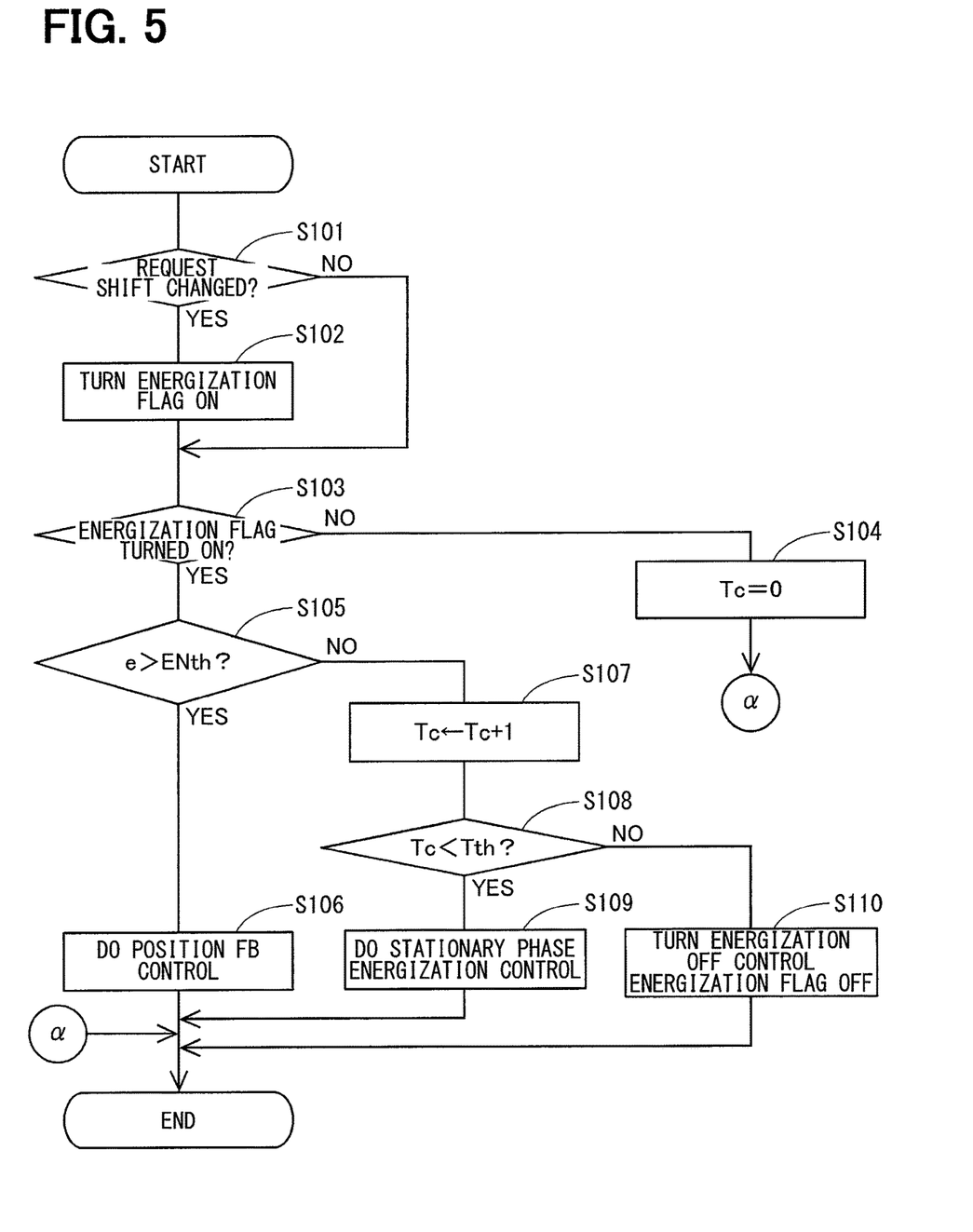
FIG. 5 is a flowchart explaining a switching control process according to the first embodiment.

The processes of S201 to S204 are similar to the processes of S101 to S104 in FIG. 5.

In S205, the switching controller 65 determines whether the angle deviation e exceeds the first angle determination threshold value e_th1. The first angle determination threshold value e_th1 is set to the count number corresponding to a value so that overshoot does not occur (for example, 1° at mechanical angle), when the motor speed Msp is high, in the other words, the motor 10 stops from a state that the motor 10 rotates at high speed. The first angle determination threshold value e_th1 is set to a higher value than a second angle determination threshold value e_th2. That is, e_th1>e_th2 is satisfied.

When it is determined that the angle deviation e is higher than the first angle determination threshold value e_th1 (S205: YES), the process shifts to S210. When it is determined that the angle deviation e is equal to or less than the first angle determination threshold value e_th1 (S205: NO), the process shifts to S206.

In S206, the switching controller 65 determines whether the motor speed Msp is less than a speed determination threshold value Msp_th. The motor speed Msp is calculated based on the actual count value Cen. The speed determination threshold value Msp_th is a value determining whether the motor 10 rotates quickly, and is set to, for example, 800 [rpm]. The speed determination threshold value Msp_th can be set to any value. When it is determined that the motor speed Msp is equal to or exceeds the speed determination threshold value Msp_th (S206: NO), the process shifts to S208. When it is determined that the motor speed Msp is less than the speed determination threshold value Msp_th (S206: YES), the process shifts to S207.

In S207, the switching controller 65 determines whether the angle deviation e exceeds the second angle determination threshold value e_th2. The second angle determination threshold value e_th2 is set to, for example, any value nearly equal to the angle determination threshold value ENth according to the first embodiment. When it is determined that the angle deviation e exceeds the second angle determination threshold value e_th2 (S207: YES), the process shifts to S210. When it is determined that the angle deviation e is equal to or less than the second angle determination threshold value e_th2 (S207: NO), the process shifts to S208.

Processes of S208 and S209 are similar to the processes of S107 and S108 in FIG. 5.

The process of S210 is similar to the process of S106. The processes of S211 and S212 are similar to the processes of S109 and S110.

According to the embodiment, in a case where the motor speed Msp is equal to or exceeds the speed determination threshold value Msp_th, that is, the rotation speed of the motor 10 is relatively fast, a control is performed so that the position FB control is shifted to the stationary energization control and the motor 10 stops when the angle deviation e becomes less than the first angle determination threshold value e_th1 set to a higher value than the second angel determination threshold value e_th2.

By contrast, in a case where the motor speed Msp is less than the speed determination threshold value Msp_th, that is, in a case where the rotation speed of the motor 10 is relatively slow, the FB control continues until the angle deviation e becomes the second angle determination threshold value e_th2. The FB control is shifted to the stationary phase energization control when the angle deviation e becomes less than the second angle determination threshold value e_th2.

In an example of FIG. 8A, the position feedback control is switched to the stationary phase energization control and the motor 10 stops when the angle deviation e becomes less than the second angle determination threshold value e_th2. According to the embodiment, the control range is set to the target count value Cen*±e_th2. In the other words, according to the embodiment, the second angle determination threshold value e_th2 is set corresponding to the control range.

The amount by which a position at which the motor 10 actually stops exceeds the target count value Cen* is set to an overshoot amount θover.

As shown in FIG. 8B, as inrush speed to control minimum value L is higher, the overshoot amount θover becomes higher. Therefore, when the rotation speed of the motor 10 is high, the angle determination threshold value is relatively low, the switching of the stationary phase energization control is performed immediately before the target position, so that a stop position of the motor 10 may exceed control maximum value H. By contrast, when the rotation speed of the motor 10 is high, the angle determination threshold value is set to a relatively high value so that the overshoot does not occur. Thereby, the motor 10 may stop at this side more than the control minimum value L in a case where the rotation speed of the motor 10 becomes low.

According to the embodiment, the switching controller 65 changes the angle determination threshold value corresponding to the motor speed Msp that is the rotation speed of the motor 10. In detail, the angle determination threshold value is set to the second angle determination threshold value e_th2 when the motor speed Msp is less than the speed determination threshold value Msp_th. The position feedback control is switched to the stationary phase energization control when the angle deviation e becomes equal to or less than the second angle determination threshold value e_th2. The angle determination threshold value is set to the first angle determination threshold value e_th1 when the motor speed Msp is equal to or exceeds the speed determination value Msp_th1. The position feedback control is switched to the stationary phase energization control when the angle deviation is equal to or less than the first angle determination threshold value e_th1.

That is, according to the embodiment, as bigger the motor speed Msp becomes, the position feedback control is switched to the stationary phase energization control at this side more than the target position.

The timing of the switching is set to be variable corresponding to the motor speed Msp, the switching being from the position feedback control to the stationary phase energization control. Thereby, it may be possible to reduce error between the stop position at when the motor 10 stops and the target position. It may be possible to surely stop the motor 10 within the control range.

The effect similarly to the embodiment described above will be provided.

Other Embodiments

According to the embodiment described above, the motor is a permanent magnet three-phase brushless motor. According to other embodiments, the motor can be employed as long as the motor can switch between position feedback control and stationary phase energization control. According to the embodiment described above, two sets of windings are provided in the motor. According to other embodiments, the number of sets of windings in the motor may be one, or three or more.

According to the embodiment described above, the position feedback control performs a 120° energization square-wave control. According to other embodiments, the position feedback control may perform a 180° energization square-wave control. The control is not limited to square-wave control. PWM control with triangle wave comparison or instantaneous vector selection is also possible.

According to the embodiment described above, an encoder is employed as the rotation angle sensor detecting the rotation angle of the motor. According to other embodiments, the rotation angle sensor may be not limited to an encoder, and any other devices may be employed, such as a resolver. According to the embodiment described above, the feedback controller has the phase advance filter, and employs the phase advance value for the position feedback control, the phase advance value being a value after the phase advance filter process is executed to the actual count. According to the other embodiments, the phase advance filter is omitted, and the position feedback may be performed by using the rotation angle of the motor for itself or value except for the encoder count value capable of being converted to the rotation angle of the motor. Similarly to the selection of the stationary phase in the stationary phase energization control, the value except for the encoder value may be employed. According to the other embodiments, the phase advance filter process may be omitted.

According to the second embodiment, the first angle determination threshold value and the second angle determination threshold value are switched by using one speed determination threshold value. According to the other embodiments, the angle determination threshold value may be gradually switched so that the angle determination threshold value becomes high as the motor speed becomes high, by using the multiple speed determination threshold values. The angle determination threshold value may be set by function corresponding to the motor speed, map or the like.

According to the embodiment described above, four recess portions are placed in the detent plate. According to the other embodiments, the number of the recess portion is not limited to four, and may be any number. For example, the number of the recess portion of the detent plate may be set to two, and P range and not P range may be set to be switched. The shift range switching mechanism and the parking lock mechanism or the like may be different from the embodiment described above.

It is noted that a flowchart or the processing of the flowchart in the present application includes multiple steps (also referred to as sections), each of which is represented, for instance, as S101. Further, each step can be divided into several sub-steps while several steps can be combined into a single step.

In the above, the embodiment, the configuration, an aspect of the shift range apparatus according to the present disclosure are exemplified. However, the present disclosure is not limited to every embodiment, every configuration and every aspect related to the present disclosure are exemplified. For example, the field of the embodiment, the configuration, the aspect relate to the present disclosure includes the embodiment, the configuration, the aspect obtained by accordingly combining each technical part disclosed in different embodiment, configuration and aspect.

What is claimed is:

1. A shift range control apparatus switching a shift range by controlling a drive of a motor, the shift range control apparatus comprising:
    a feedback controller that is configured to perform position feedback control based on an actual angle of the motor and a target angle determined corresponding to a request shift range;
    a stationary phase energization controller that is configured to perform stationary phase energization control energizing a stationary phase selected corresponding to the actual angle; and
    a switching controller that is configured to switch a control state of the motor,
    wherein:
    the switching controller sets the control state to the position feedback control when the request shift range is switched;
    the switching controller switches the control state from the position feedback control to the stationary phase energization control when a difference value between the target angle and the actual angle becomes equal to or less than an angle determination threshold value;
    the switching controller continues the stationary phase energization control until an energization duration elapses after the position feedback control is switched to the stationary phase energization control; and
    the switching controller switches the control state to an energization off control in which an energization to the motor is shut off, at the time when the energization duration elapses after the position feedback control has been switched to the stationary phase energization control.

2. The shift range control apparatus according to claim 1, wherein:
    the feedback controller is provided with a phase advance filter that is configured to advance phase of the actual angle.

3. The shift range control apparatus according to claim 1, wherein:
    the switching controller changes the angle determination threshold value corresponding to a rotation speed of the motor.

4. The shift range control apparatus according to claim 1, wherein:
    in the stationary phase energization control, the stationary phase energization controller fixes an excitation phase by causing current to flow in a predetermined direction of the selected stationary phase to cause the motor to stop at a predetermined electrical angle corresponding to the fixed excitation phase.

* * * * *